April 2, 1968  A. J. SARKA  3,375,762
CUTTING AND/OR CREASING APPARATUS
Filed Nov. 22, 1965  3 Sheets-Sheet 1

INVENTOR.
ALBERT J. SARKA
BY
Hoffmann and Yount
ATTORNEYS

April 2, 1968  A. J. SARKA  3,375,762
CUTTING AND/OR CREASING APPARATUS
Filed Nov. 22, 1965  3 Sheets-Sheet 3

INVENTOR.
BY ALBERT J. SARKA
Hoffmann and Yount
ATTORNEYS

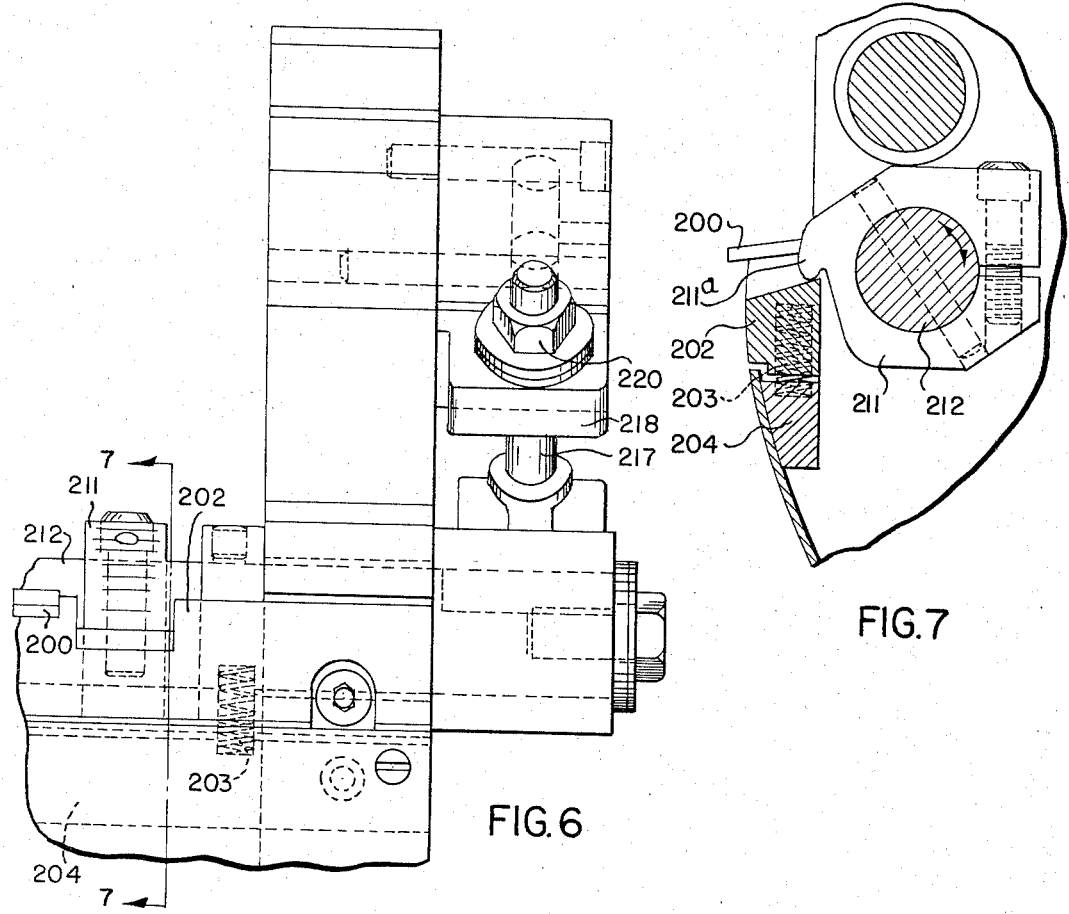
FIG. 7
FIG. 6
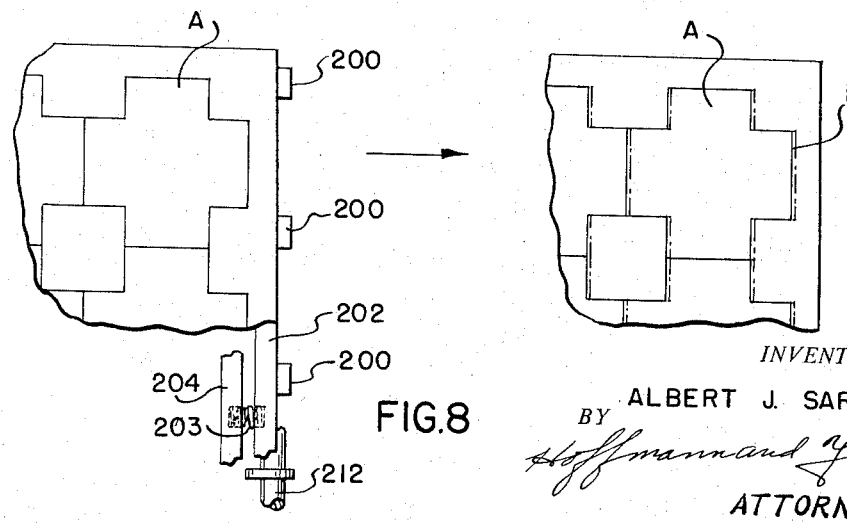
FIG. 8
INVENTOR.
ALBERT J. SARKA
BY Hoffmann and Yount
ATTORNEYS

United States Patent Office 3,375,762
Patented Apr. 2, 1968

3,375,762
CUTTING AND/OR CREASING APPARATUS
Albert J. Sarka, Fairview Park, Ohio, assignor to Harris-Intertype Corporation, Cleveland, Ohio, a corporation of Delaware
Filed Nov. 22, 1965, Ser. No. 508,914
15 Claims. (Cl. 93—58.2)

The present invention relates to an apparatus for operating on sheet material, and particularly relates to a cutting and/or creasing apparatus including a pair of rotary cylinders defining a nip therebetween and which cooperate to cut and/or crease material advanced through the nip defined by the cylinders.

A recent development in the cutting and creasing art is disclosed in United States Patent No. 3,142,233. The recent development, in general, involves a new cutting and creasing procedure wherein cutting and/or creasing is effected by cooperating projecting members carried by rotary cylinders. The projecting members cooperate upon rotation of the cylinders to effect the cutting and/or creasing of the material. The projecting members comprise projecting land members on the cylinders which overlap in the plane of the material to a slight degree so as to effect the cutting of the material, and land members on one cylinder which force material between land members on another cylinder to effect a creasing of the material. Cutting and creasing in this manner require accurate positioning of the projecting members on the cylinders so that the projecting members cooperate properly to effect cutting and/or creasing.

Accordingly, the principal object of the present invention is the provision of a new and improved apparatus for cutting and/or creasing sheet material which includes a pair of rotary cylinders, each of which carry a plurality of projecting members thereon to effect a cutting and/or creasing of material carried through a material forming nip defined by the cylinders and which is constructed so as to provide for ready and easy adjustment of the location of the projecting members on one cylinder relative to the projecting members on the other cylinder so that the projecting members properly cooperate upon rotation of the cylinders to effect the cutting and/or creasing of the material.

Another object of the present invention is the provision of a new and improved apparatus for cutting and/or creasing sheet material, as noted in the next preceding paragraph, wherein the rotary cylinders carry flexible die plates, with each of the die plates having the projecting members thereon, and wherein the flexible die plates are secured to the cylinders by plate clamps which are adjustable relative to the cylinders so as to adjust the location of the projecting members on one cylinder relative to the projecting members on the other cylinder, and wherein at least one of the cylinders is also bodily movable relative to the other cylinder to change the location of the projecting members carried by the one cylinder.

A still further object of the present invention is the provision of a new and improved apparatus for cutting and/or creasing sheet material having a printed image thereon and which includes a pair of cylinders defining a sheet forming nip with the cylinders having a plurality of cooperating portions thereon defining a cutting and/or creasing pattern and wherein the cooperating portions on the cylinders function to effect a cutting and/or creasing of the material and may be adjusted to proper relative locations, and wherein a sheet is readily and reliably located so as to register the printed image on the sheet with the cutting and/or creasing pattern.

A still further object of the present invention is the provision of a new and improved apparatus for cutting and/or creasing sheet material, as noted in the next preceding paragraph, wherein the apparatus further includes a means for feeding the sheets into the nip and the registering mechanism for registering the sheets includes means for adjusting the position of the leading edge of the sheet relative to the cooperating portions prior to entry of the sheet into the nip to effect a registry of the printed image on the sheet with the cutting and/or creasing pattern.

Still another object of the present invention is the provision of a new and improved apparatus for cutting and/or creasing sheet material, as noted in the next preceding paragraph, wherein the means for feeding the sheets into the nip includes gripper means for engaging the sheet at the leading edge thereof and the registering mechanism includes a plurality of members engageable with the leading edge of the sheet to locate the leading edge of the sheet prior to being gripped by the gripper means and wherein the plurality of members are adjustable in order to vary the location of the leading edge of the sheet prior to being gripped by the gripper means.

A still further object of the present invention is the provision of a new and improved apparatus for operating on sheet material including a pair of cylinders defining a nip therebetween and means for feeding sheets toward the nip and a registering mechanism for registering the sheets prior to their entry into the nip and wherein the means for feeding the sheets includes a feed cylinder carrying a gripper means for gripping the leading edge of the sheet and the registering mechanism includes a plurality of stop members engageable with the leading edge of the sheet and which are carried on a rigid nonflexible bar extending axially of the cylinder and carried by the cylinder and wherein the bar is movable circumferentially of the cylinder for adjustment of the members carried thereby by cam means movable to effect movement of the bar for adjustment purposes and wherein the cam means are moved by manual actuation of a linkage carried by the cylinder.

Further objects and advantages of the present invention will be apparent to those skilled in the art to which it relates from the following detailed description of the preferred embodiment thereof made with reference to the accompanying drawings forming a part of this specification and in which:

FIG. 6 is a view of the apparatus shown in FIG. 5, looking at the apparatus of FIG. 5 from the left;

FIG. 7 is a sectional view of the apparatus shown in FIG. 6, taken approximately along the section line 7—7 thereof; and FIG. 8 is a schematic view illustrating the operation of the apparatus of FIG. 1.

The present invention provides an improved apparatus for operating on material, and particularly provides an improved apparatus for cutting and/or creasing material wherein a pair of cylinders having material forming portions rotate to effect the cutting and/or creasing of material advanced through the nip defined by the cylinders. The present invention may be embodied in different apparatuses for operating on material in either web or sheet form. However, the present invention finds particularly utility in an apparatus for cutting and/or creasing cardboard sheets having an image printed thereon to form a box blank therefrom, with the printed image forming a label, background, or other marking on the box.

Figure 1:
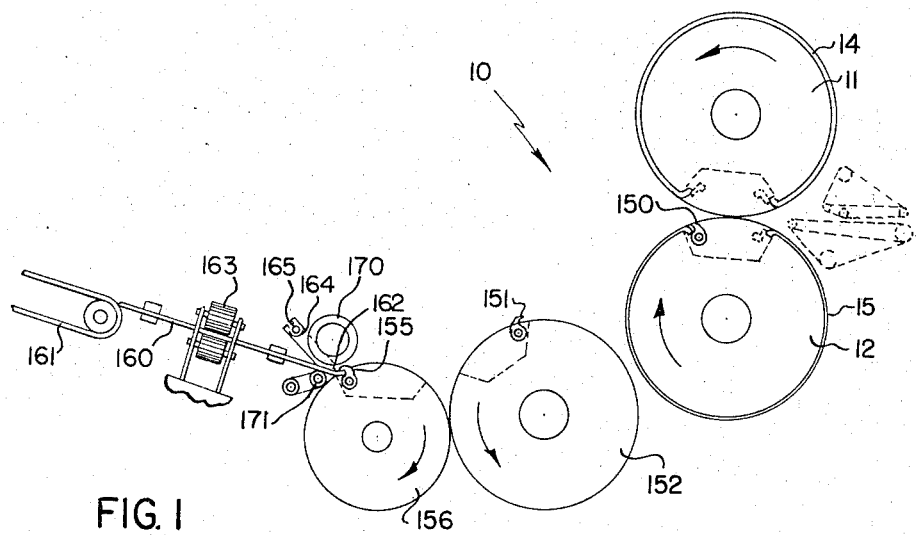
FIG. 1 is a schematic side elevational view of an apparatus embodying the present invention.
Figure 2:
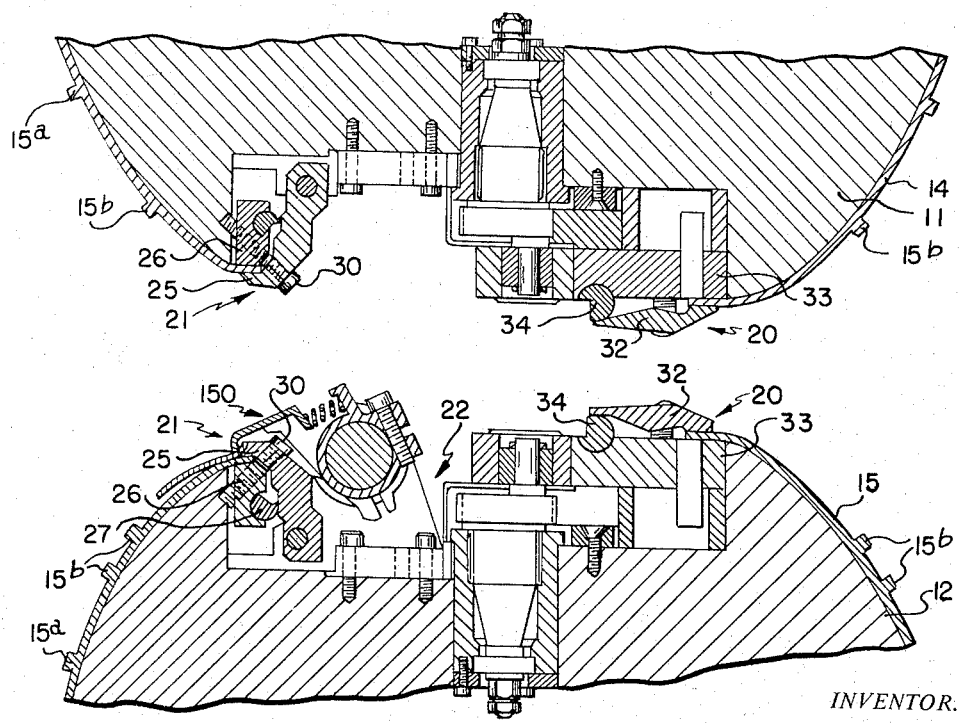
FIG. 2 is a fragmentary sectional view of a portion of the apparatus of FIG. 1.

Accordingly, as representing the preferred embodiment of the present invention, FIG. 1 illustrates a cutting and creasing apparatus 10 for cutting and creasing cardboard sheets having a printed image thereon to form box blanks therefrom. The cutting and creasing apparatus 10 is operable to cut and/or crease material and includes a pair of cylinders 11, 12 which rotate in close proximity and define a nip therebetween. As material is advanced through the nip defined by the cylinders 11, 12, the material is cut and/or creased.

The cutting and/or creasing of the material is performed by sheet forming members carried by the cylinders 11, 12. The sheet forming members, in the preferred embodiment, are formed integrally with and project from flexible plates or dies 14, 15, carried by the cylinders 11, 12, respectively, and are located on the dies to form the desired cutting or creasing pattern. The sheet forming members carried by the plates 14, 15 are in the form of projecting lands and cooperate to effect a cutting and/or creasing of the material upon rotation of the cylinders 11, 12. The lands extend axially and/or circumferentially of the cylinders 11, 12, depending on the pattern to be cut. The cutting of the material is effected by a pair of lands 15a, one of which is located on each of the cylinders. These lands engage the material in a slightly overlapping relationship in the plane of the material and extend through the sheet material a substantial distance but do not touch, and effect a so-called "rupture cutting" of the material. The creasing operation is effected by male and female elements 15b carried by the respective cylinders, with the male creasing element forcing the material between the members comprising the female creasing element.

The "rupture cutting" effected by the cutting lands and the creasing of the sheet material, as effected by the female and male creasing lands, are described in detail in United States patent to Downie, No. 3,142,233, issued July 28, 1964. The above-mentioned patent describes the particular dimensioning of these lands for carrying out the purposes of rupture cutting and creasing and the particular dimensioning of the lands in the present structure is the same as that disclosed in the Downie patent, and it is believed unnecesary, in view of the disclosure in the Downie patent, to make a detailed disclosure herein.

It should be apparent from the above, however, that the relative positioning of the lands on the plates 14, 15 is extremely important so as to provide an effective cutting of the sheet material. If the overlap of the cutting lands is too great or too little, the material may not be cut. Moreover, if there is no overlap, the material may be creased rather than cut. The particular positioning of the creasing lands is important in that if the relative positioning thereof is such that the male creasing member overlaps with one of the projecting members comprising the female member, cutting of the material may be effected rather than a creasing thereof.

The apparatus 10 is constructed so as to provide for and permit the proper relative positioning of the projecting members on the dies 14, 15 so that these projecting members will readily effect a clean cutting and creasing of the sheet material, as desired. As noted hereinabove, the projecting elements which are operable to effect the cutting and/or creasing of the sheet material are carried by the plates 14, 15 carried on the cylinders 11, 12. The flexible plates 14, 15 are held on the cylinders 11, 12, respectively, by plate clamp means. The plate clamp means are identical in construction and only the plate clamp means for holding the plate 15 on the cylinder 12 will be described in detail. It should be understood, of course, that the specific construction of the plate clamp means carried by the cylinder 12 is the same as that carried by the cylinder 11 and similar parts thereof are given the same reference numerals.

The plate clamp means for holding the plate 15 on the cylinder 12 comprises a trailing edge plate clamp 20 and a leading edge plate clamp 21 located in an axially extending gap 22 in the cylinder 12. The plate 15 extends around the cylinder and its opposte ends terminate adjacent the opposite sides of the gap 22. The front edge plate clamp 21 is located at one edge of the gap 51 to clamp the forward edge of the plate 15 to the cylinder, while the trailing edge plate clamp 20 is located at the opposite edge of the gap 22 to clamp the trailing edge of the plate 15 to the cylinder 12. The front and rear plate clamp units are described in detail in copending application Ser. No. 488,349, assigned to the assignee of the present invention, and a detailed description thereof will not be made.

The plate clamp unit 21 comprises a plurality of pairs of relatively movable plate clamping jaws 25, 26 which are operable to clamp the leading edge of the plate therebetween. Each jaw 25 is movable relative to its associated jaw 26 between open and closed positions to clamp the leading edge of plate 15 therebetween. Each jaw 25 is biased to an open position away from the jaw 26 by compression springs, not shown, and may be moved to a closed or clamping position by rotation of a rod 27 which when rotated moves the jaw 25 between its open and closed positions.

Suitable means are associated with the forward plate clamp unit 21 so as to provide for movement of the unit 21 circumferentially of the cylinder 12 so as to cause the plate 15 to tightly engage the cylinder 12. This means is in the form of jackscrews 30, only one of which is shown in the drawings, and which are threadedly engaged in a threaded opening in the jaw 25 and project through an aligned opening in the jaw 26. The jackscrews 30 each have a forward end or tip which is held in abutting engagement with the bottom wall of a cutout portion of the cylinder 12. By turning the screws, the forward ends thereof bear against the cutout portion of the cylinder and cause the plate clamp units 21 to move away from the adjacent side of the gap for adjustment of the plate 15 on the cylinder 12.

The rear plate clamp unit 20 which clamps the trailing side of the plate 15 to the cylinder 12 comprises a pair of relatively movable jaws or plate clamping members 32, 33. The jaw 32 is rockable between an open position and a closed position relative to the jaw 33. The jaw 32 is moved between its open and closed positions upon rotation of a rod 34. The jaw 34 is carried by the jaw 33 and the jaw 33, in turn, is slidably supported for movement in the gap 22 relative to the cylinder 12 for purposes of properly positioning and locating the plate 15 on the cylinder 12 in a snug tight manner.

When it is desired to located the die plate 15 on the cylinder 12, the forward plate clamp unit 21 is moved to its open position and the leading edge of the plate 15 is positioned between the jaws 25, 26. The jaws have openings therein designated 35, see FIG. 4, and the plate 15 has corresponding openings which are adapted to be aligned with the openings 35 in the jaw 25 of the plate clamp unit 21. Registration pins are inserted into the aligned openings in order to properly locate the plate 15 relative to the plate clamp unit 21 on the cylinder 12. The leading edge of the plate is then clamped into position and the gauge pins which are located in the openings 35 may be removed therefrom. After the leading edge of the plate is clamped, the cylinder is jogged to rotate under pressure to a position until only the trailing edge of the plate 15 remains free. The trailing edge of the plate is then inserted between the jaws 32, 33 of the plate clamping unit 15. The plate clamping unit 20 is also provided with an opening, not shown, in the central jaw thereof and a gauge pin is adapted to be inserted through the opening and into an aligned opening in the plate 15. The rear plate clamp unit 22 is then moved to its closed position to secure the plate 15 on the cylinder 12.

Figure 4:
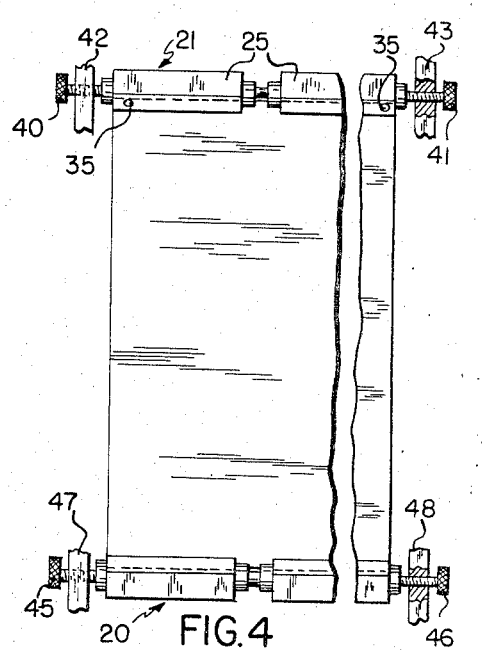
FIG. 4 is a schematic developed view of still another portion of the apparatus of FIG. 1.

In view of the particular construction of the plates 14, 15, it is desirable to provide for adjustment of the plates 14, 15 on the cylinders 11, 12 so that the plates 14, 15 properly cooperate to effect the cutting and creasing of the sheet material. If the plates 14, 15 are not properly adjusted, the cooperating projecting lands for cutting and creasing of the material will not be effective and as a result, the plates will not operate as desired. To provide for adjustment of the plates, the plate clamp units 21, 22 are movable axially of the cylinder 12. Any adjustment mechanism may be provided therefor and a suitable adjustment mechanism is shown schematically in FIG. 4. The adjustment of the plate clamp unit 21, as shown schematically in FIG. 4, is accomplished by means of a pair of adjusting screws 40, 41 which are located at opposite sides of the cylinder 12 and are threaded into frame portions 42, 43, respectively. The adjusting screws 40, 41 bear against the opposite portions of the plate clamp unit 21 and may be threaded into and out of the frame portions 42, 43 to effect axial movement thereof. The adjustment of the trailing edge plate clamp unit 20 is provided in a similar manner by a pair of adjusting screws 45, 46 which are threaded into frame portions 47, 48, respectively. The adjusting screws 45, 46 bear against opposite portions of the trailing plate clamp unit 20 and may be threaded into and out of the frame portions 47, 48 to effect axial movement of the plate clamp unit 20.

From the above, it should be readily apparent that the plates 14, 15 may be adjusted somewhat on the cylinders 11, 12, respectively, by movement of the plate clamps. However, the adjustment of the plate clamp units is relatively slight and may be utilized for providing the necessary alignment between the plates for proper cooperation of the cutting elements. However, where adjustment to a great extent is necessary to effect proper alignment of the pattern of material forming members with the printed images, as well as proper cutting and creasing, the apparatus may be adjusted by bodily moving one of the cylinders 11 or 12 with respect to the other.

Figure 3:
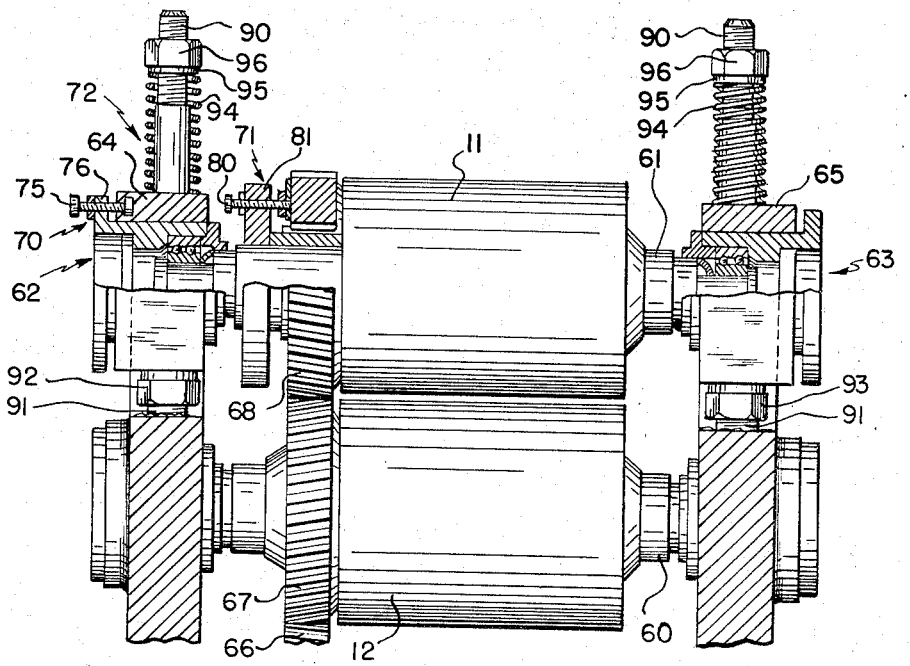
FIG. 3 is a fragmentary view, partly in section, of another portion of the apparatus shown in FIG. 1.

By way of example, the drawings illustrate that the cylinder 11 is adjustable relative to the cylinder 12. The cylinder 11 may be moved toward and away from the cylinder 12 in order to adjust the gap between the cylinders and adjust the nip therebetween. The cylinder 11 may also be moved axially relative to the cylinder 12 and thereby adjust the relative axial positions of the plates 14, 15 thereon. The cylinder 11 may also be rotated relative to the cylinder 12 for adjustment purposes to properly adjust the circumferential location of the material forming elements on the cylinder 11 relative to the material forming elements on the cylinder 12. The particular construction and particular mounting of the cylinder 11 for such adjustment purposes may vary and is shown in FIG. 3 and is similar to the construction shown in copending application Ser. No. 487,961, filed Aug. 27, 1965, now Patent No. 3,238,853.

Referring now to FIG. 3, which illustrates the cylinders 11, 12 without plates 14, 15, respectively, mounted thereon, the cylinder 12 is shown as secured to a shaft 60. The opposite ends of the shaft 60 are rotatably supported by suitable bearing assemblies. The cylinder 11 is secured to a shaft 61 which extends parallel to the shaft 60, and the opposite ends of which are rotatably supported by bearing assemblies 62, 63. The bearing assemblies 62, 63 are positioned in and supported by sleeve members 64, 65, respectively, for sliding movement relative thereto, for a purpose to be described hereinbelow. The cylinders 11, 12 are rotated in unison by a driving helical gear 66 which meshes with a helical gear 67 fixedly mounted on the shaft 60 and which, in turn, meshes with a helical gear 68 supported on the shaft 61, but nonrotatable with respect thereto. The gear 68 is splined to shaft 61 and is axially slidable therealong, for a purpose to be described hereinbelow.

As noted above, the cylinder 11 is adjustable relative to the cylinder 12. The adjusting mechanism for cylinder 11 includes means 70 for moving the cylinder 11 axially relative to the cylinder 12, means 71 for rotating the cylinder 11 relative to the cylinder 12, and means 72 for moving the cylinder 11 toward and away from the cylinder 12. The adjusting means 70 for moving the cylinder 11 axially preferably includes a screw 75 extending parallel to shaft 61. The left end of the screw 75, as viewed in FIG. 3, extends to the left beyond the bearing assembly 62 and is provided with a head so that a suitable tool, such as a wrench, may be used to rotate the screw. The other end of the screw 75 is provided with an enlargement thereon located in a groove in the sleeve member 64 which slidably supports the bearing assembly 62. The groove permits the enlargement to rotate relative to the sleeve member 64 but prevents any axial movement of the screw 75 relative to the sleeve member 64. The screw 75 extends through and is threadedly engaged in a threaded passageway in a projecting portion 76 of the bearing assembly 62. It should be apparent from the above that upon rotation of the screw 75, the projecting portion 76 is moved along the screw 75 and the bearing assembly 62 moves. The bearing assemblies 62, 63 are thus slid relative to the sleeves 62, 63, respectively, and the cylinder 11 is thereby moved axially of the cylinder 12. A plurality of screws corresponding to screw 75 may be utilized, if deemed desirable.

The adjusting mechanism 71 for rotating the cylinder 11 relative to the cylinder 12 to effect the angular adjustment preferably comprises a screw 80 which extends parallel to shaft 61 and which is moved axially to effect the adjustment. The screw 80 threads into a collar 81 which is fixedly secured to the shaft 61 of the cylinder 11 and projects to the left outwardly beyond the collar, as the latter is viewed in FIG. 3. The inner end of the screw 80 is secured to the gear 68, which, as afore-mentioned, is slidably mounted on the shaft 61. The screw 80 is secured to gear 68 for rotation relative thereto and is held against axial movement relative thereto, and upon rotation, the screw 80 moves axially relative to the collar 81 and causes the gear 68 to slide axially along shaft 61 relative to the gear 67. Since the gears 67, 68 are helical gears, axial movement of the gear 68 relative to the gear 67 causes the gear 68 to be rotated, and rotation of the gear 68 causes rotation of the cylinder 11. This alters the angular relation between cylinders 11, 12 and the plates mounted thereon. The gear 67 does not rotate relative to gear 68 because driving gear 66 in mesh with gear 67 provides a resistance to such rotation. It should be apparent from the above description that a plurality of screws 80 may be used to move gear 68, if desirable.

To provide adjustment of the cylinder 11 toward and away from the cylinder 12, the sleeves 62, 63 which support the opposite ends of the shaft 61 for the cylinder 11 are each slidable on a pair of rod elements 90. The rod elements 90 extend generally parallel to a line through and perpendicular to the axes of the cylinders 11, 12. The rod elements are fixed relative to the cylinder 11 and are shown as having their ends 91 adjacent cylinder 12 welded to the frame. The sleeves 64, 65 engage nuts 92, 93 threaded onto the rod elements and are urged to a position in engagement with the nuts 64, 65 by springs 94 disposed about the upper ends of the rod elements 90. The springs 94 each have one end abutting the adjacent one of the sleeves 64, 65 and the other end abutting a stop provided by a washer 95 which bears against a respective nut 96 threaded onto the outer end of the respective rod element. The cylinder 11 may be moved toward or away from the cylinder 12 along a path parallel to the rods 90 by adjusting the nuts 92, 93, which cause movement of the sleeve members 64, 65, respectively, relative to the frame, and the force with which the cylinder 11 is held against the nuts may be adjusted by adjusting the nuts 92, 93. The teeth of the helical gears 67, 68 are constructed so that there is sufficient play in the teeth in a radial direction to permit the desired amount of movement of the cylinder 11 without breaking the accurate intermeshing engagement of the gears.

From the above description, it should be readily apparent that the cutting and creasing members carried by the cylinders 11, 12 may be readily adjusted so as to properly effect a cutting of the material which is advanced through the nip defined by the cylinders. The apparatus 10, as noted hereinabove, is operable to effect a cutting of sheet material advanced therethrough.

The sheet material is advanced into the nip defined by the cylinders 11, 12 by gripper means 150 carried by the cylinder 12, see FIG. 1. The gripper means 150 grips a sheet at the leading edge thereof and advances the leading edge of the sheet into the nip defined by the cylinders 11, 12 and releases the leading edge of the sheet after it has been advanced into the nip defined by the cylinders 11, 12. The gripper means 150 receives the leading edge of the sheet from a gripper means 151 carried by an advancing cylinder 152. The transfer of the leading edge of the sheet from the gripper means 151 to the gripper means 150 is effected without movement of the sheet relative to the circumference of the cylinders 152, 12. The gripper means 151 receives the leading edge of the sheet from the gripper means 155 carried on a feed cylinder 156. The gripper means 155 grips the leading edge of the sheet and carries the leading edge of the sheet around the circumference of the cylinder 156 and transfers the leading edge of the sheet to the gripper means 151 carried by the cylinder 152.

The gripper means 155 grips the leading edge of the sheet after it has been registered on a feedboard 160. The sheet to be advanced into the nip defined by the cylinders 11, 12 are advanced by a conveyor 161 onto the feedboard 160. The leading edges of the sheets engage a plurality of front stops 162 which move into the path of the leading edge of the sheet of material and stop the sheet to thereby register the leading edge of the sheet. A suitable side registry of the sheet is also effected by means of a pair of rollers 163 which move the sheet laterally of the feedboard so that the side edge of the sheet engages side lays, not shown. The front stops 162 comprises the outer tips of arm members 164 which are supported for pivotal movement with a shaft 165. The shaft when pivoted moves the stops 162 out of the path of movement of the sheet and a roller 170 moves into engagement with the underside of the sheet and presses the sheet against the roller 171 which cooperates therewith to effect feeding of the sheet toward the advancing cylinder 156. The advancing cylinder 156 carries the gripper means 155, as noted hereinabove.

Figure 5:
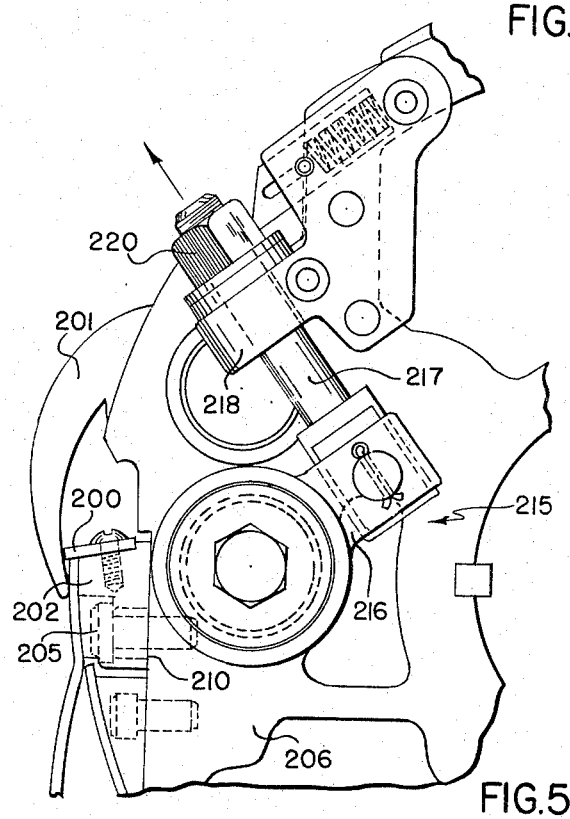
FIG. 5 is a fragmentary end elevational view of a portion of the apparatus shown in FIG. 1.

The feed rollers 170, 171 feed the sheet at a speed in excess of the speed of rotation of the cylinder 156 and feed the sheet into engagement with a plurality of locating gauge pin members 200. The overfeeding of the sheet by the rolls 170, 171 is sufficient to cause a buckling of the sheet, as shown in FIG. 5. When the sheet has been buckled, as shown in FIG. 5, and with the leading edge thereof in engagement with the pins 200 which are spaced along the axis of the cylinder 156, gripper fingers 201 forming a part of the gripper means 155 move to a closed position to effect a gripping of the sheet for movement with the cylinder 156. The sheet is then fed into the nip defined by the cylinders 11, 12 without relative movement of the sheet with respect to the gripper means carried by the various cylinders which effect the feeding of the sheet.

The apparatus 10 and, specifically, the registering mechanism for registering the leading edge of the sheet which includes the pins 200 includes means for adjusting the position of the leading edge of the sheet so that the printed image on a sheet will register properly with the cutting and creasing elements when the sheet arrives in the cutting nip. Even though the cutting and creasing elements have been properly located so as to cooperate and effect a cut due to their cooperation, the printed image on the sheet may not register with the pattern of the cutting and creasing elements. In this event, the cutting and creasing elements cannot be adjusted because any adjustment of the cutting and creasing elements may destroy their relative positioning so that they will not properly cooperate to effect the cut or crease. However, by adjusting the gauge pins 200, the leading edge of the sheet at the registering station may be adjusted, either forwardly or backwardly, in the direction of feed thereof so that when the sheet arrives in the cutting nip, the printed image thereon properly registers with the cutting pattern on the plates 14, 15.

The pins 200 are adjustable circumferentially of the cylinder 156 and are carried by a rigid nonflexible bar 202 which extends axially of the cylinder. The bar 202 is biased by a plurality of springs 203 which engage the bar 202 and engage a bar 204 fixed to the cylinders. The springs 203 bias the bar 202 away from the bar 204 to a given position. The bar 202 is secured to the cylinder 156 by means of a plurality of fasteners or screws 205 which clamp against the bar 202 and are threaded into a frame portion 206 of the cylinder 156. The screws 205 extend through an opening in the bar 202 and have clearance between the sides of the opening, as designated in FIG. 5 at 210, so as to permit movement of the bar 202 relative to the screws 205.

The bar 202 is moved circumferentially of the cylinder 156 and against the bias of the springs 203 by cam means which includes a plurality of cams 211 mounted on a rotatable bar 212 which extends along the axis of the cylinder. The cam 211 has a cam portion 211a which engages the bar 202, and upon rotation of the shaft 212 in a counterclockwise direction as viewed in FIG. 7, the cam portion 211a moves the bar 202 toward the bar 204 and against the bias of the springs 203. This, of course, effects a positioning of the pins 200 so as to vary the location of the leading edge of the sheet when the leading edge of the sheet is gripped by the gripper fingers 201. The overfeeding by the rolls 170, 171, of course, is sufficient to result in an overfeeding regardless of the position of the bar 202.

The shaft 212 is rotated so as to effect the adjustment of the bar 202 by a suitable linkage arrangement, best shown in FIG. 5 and generally designated 215. The linkage 215 includes a suitable lever or link member 216 fixedly connected to the shaft 212, and which when moved effects a movement of the bar 202. The outer end of the lever member 216 is suitably connected with a rod member 217 which extends outwardly of the cylinder and through an opening in a support bracket 218. The outer end of the rod 217 carries a nut member 220 which is threadedly engaged with the outer end of the member 217.

The threaded engagement between the nut member 220 and the rod 217 is such that when the nut member 220 is rotated so as to move down on the rod 217, as viewed in the drawings, the rod 217 is pulled out by the rotation of the nut 220, since the nut 220 is fixed from downward movement by engaging a portion of the bracket 218. When the rod member 217 moves outwardly relative to the cylinder in the direction of the arrow shown in FIG. 5, the shaft member 212 is rotated in a counterclockwise direction, as shown in FIG. 7, to effect a movement of the bar 202 against the bias of the springs 203 and cause an adjustment of the position of the gauge pins 200. When the nut member 220 is rotated in the other direction relative to the rod 217, it tends to move outwardly relative to the rod. However, the rod 217 tends to move downwardly and inwardly of the cylinder. When this occurs, of course, the springs 203 bias the bar 202 circumferentially of the cylinder and away from the bar 204. Thus by this mechanism, it should be apparent that the position of the gauge pins 200 may be adjusted so as to vary the position of the leading edge of the sheet prior to the sheet being gripped by the gripper for advancing the sheet toward the cutting nip. This also varies the position of the leading edge of the sheet relative to the die plates 14, 15 when it arrives in the nip.

From the above, it should be apparent that the various parts of the apparatus 10 are adjustable for different purposes in order to provide for proper setup for cutting and/or creasing of the material. The cutting and creasing patterns defined by the projecting land members are accurately positioned on the plates in the formation of the plates in a manner not forming a part of this application. The plates are then, as described hereinabove, accurately positioned on the cylinders and are adjustable relative to the cylinders due to operation of the plate clamp units. The cylinder 11 is bodily movable in order to properly align the cutting and creasing elements to effect the cutting and creasing as desired. Thus, the apparatus 10 is readily adjusted in order to provide the proper relationship between the projecting members on the die plates.

Moreover, the apparatus is operable in order to register the printed sheet to the plates, once they have been aligned. In the event that the condition occurs which is illustrated in FIG. 8, namely, the printed images, designated A in FIG. 8 and shown in full lines are not in alignment with the cutting pattern, designated B in FIG. 8 and shown in dot-dash lines, and specifically the printed images on the sheet leads the pattern defined by the cutting and/or creasing members as shown in FIG. 8. In the event that this condition occurs, adjustment of the gauge pins 200 rearwardly by the amount of the misalignment between the cutting pattern and the printed image causes the sheet to arrive in the cutting nip slightly later and in alignment with the cutting pattern on the die plates. In the event that the printed image on the sheet lags the pattern on the die plates, the gauge pins may be adjusted forwardly or to the right, as viewed in FIG. 8, in order to advance the time at which the leading edge of the sheet arrives in the nip sufficiently so as to cause alignment of the printed images on the sheet with the pattern on the die plates. Thus, it should be apparent that extremely accurate cutting and creasing can be effected by the apparatus 10 due to the various adjustments and due to the fact that the images are registered to the plates, the plates are registered to the cylinders, the plates are registered to each other, and the printed sheet is then registered to the plates.

It should be apparent that the above is a detailed description of the preferred embodiment of the present invention and that certain changes, adaptations, and modifications may be made therein by those skilled in the art to which it relates, and it is hereby intended to cover all such changes, adaptations, and modifications which come within the scope of the appended claims.

Having described my invention, I claim:

1. An apparatus for cutting and/or creasing material comprising a pair of rotary cylinders having complementary flexible die plates mounted thereon, said cylinders with said die plates defining a material forming nip therebetween, each of said die plates having a plurality of projecting members thereon defining a cutting and/or creasing pattern, means for moving one of said cylinders relative to the other of said cylinders to change the relative locations of the projecting members carried by each of said cylinders, and plate clamp means for securing each of said die plates to said cylinders and including means for moving said die plates relative to said cylinders whereby said projecting members may be properly adjusted relative to each other.

2. An apparatus for cutting and/or creasing material as defined in claim 1 wherein said means for moving one of said cylinders comprises means for bodily moving said one of said cylinders axially, means for moving said one of said cylinders toward and away from the other cylinder, and means for rotating said one of said cylinders relative to the other.

3. An apparatus for cutting and/or creasing material as defined in claim 1 wherein said means for moving said die plates relative to said cylinders includes means for moving at least one end of said die plates axially relative to said cylinders.

4. An apparatus for cutting and/or creasing material as defined in claim 1 wherein said material is in sheet form and has a printed image thereon and further including means for registering the sheet with the die plates prior to delivery thereof into said nip, and means for feeding and introducing the sheet in registered condition into said nip.

5. An apparatus for cutting and/or creasing material as defined in claim 4 wherein said means for registering includes means for adjusting the position of the leading edge of the sheet relative to said projecting members on said cylinders prior to entry of the sheet into said nip to effect registry of the printed image on the sheet with the projecting members when the sheet arrives in said nip.

6. An apparatus for cutting and/or creasing material as defined in claim 5 wherein said means for registering includes a plurality of members for engaging the leading edge of the sheet prior to entry of the sheet into the nip to thereby locate the sheet, and wherein said feeding means includes gripper means for gripping the leading edge of the sheet after it has been engaged and located by said plurality of members, and means for adjusting the location of said members relative to said gripper means to vary the location where said gripper means engages the sheets.

7. An apparatus for cutting and/or creasing material as defined in claim 6 wherein said plurality of members are carried by a bar carried by a feed cylinder and the gripper means comprises grippers carried by the feed cylinder, and the means for adjusting the location of the members comprises means for adjusting the circumferential position of the bar relative to the feed cylinder.

8. An apparatus for cutting and/or creasing material as defined in claim 7 wherein the means for adjusting the bar includes cam means carried on a rotatable shaft extending axially of the feed cylinder and engageable with said bar, and means for rotating the shaft to effect rotation of the cam means and adjustment of the bar and including cooperating screw and nut members.

9. An apparatus for cutting and/or creasing sheet material having a printed image thereon comprising a pair of rotary cylinders, said cylinders defining a sheet forming nip therebetween, said cylinders having a plurality of cooperating portions thereon defining a cutting and/or creasing pattern on each of said cylinders, means for varying the relative positions of said cooperating portions to cause said cooperating portions to cut and/or crease the sheet material upon rotation thereof, a registering mechanism for registering said sheets prior to entry into the nip including means for adjusting the position of the leading edge of a sheet relative to said cooperating portions prior to entry into said nip to effect registry of the printed image thereon with the cooperating portions when the sheet arrives in the nip, and means for feeding sheets in registered condition into the nip defined by said rotary cylinders.

10. An apparatus for cutting and/or creasing sheet material as defined in claim 9 wherein said feeding means includes gripper means for gripping the leading edge of a sheet and conveying the sheet and said registering mechanism includes a plurality of members engageable with the leading edge of a sheet to locate the leading edge of the sheet relative to the gripper means prior to gripping thereof, and means for adjusting the location of said members relative to said gripper means to adjust the position of the leading edge of the sheet when gripped by said gripper means thereby effecting an alignment of the printed image with said cutting and/or creasing pattern when the sheet arrives in said nip.

11. An apparatus for cutting and/or creasing sheet material as defined in claim 10 wherein said gripper means is movable, and second gripper means carried on a sheet advancing cylinder for receiving the leading edge of the sheet from the first gripper means and advancing the leading edge of the sheet toward the cutting nip.

12. An apparatus for cutting and/or creasing sheet material as defined in claim 11 wherein said members are supported on an adjustable bar carried by a cylinder which also carries said gripper means and including means for adjusting the bar circumferentially of the cylinder means.

13. An apparatus for operating on sheet material comprising a pair of rotary cylinders defining a nip therebetween, means for feeding sheets into the nip defined by said rotary cylinders including gripper means carried by a feed cylinder and engageable with the leading edge of the sheet to advance the sheet around the feed cylinder toward the nip, a registering mechanism for registering the leading edge of the sheet prior to being gripped by said gripper means, said registering mechanism including a plurality of members engageable with the leading edge of the sheet and spaced axially of the cylinder, an axially extending circumferentially adjustable bar carried by said feed cylinder and supporting said members, means for moving said bar circumferentially of the cylinder to vary the location of said members including spring means biasing said bar in one direction and cam means carried by an axially extending shaft and engageable with said bar to effect adjustment of the bar against the bias of said spring means upon rotation of said shaft in one direction.

14. An apparatus for operating on sheet material as defined in claim 13 further including means for rotating said shaft including a rod member having a threaded portion and a nut member threaded on the said threaded portion of said rod member, one of said members being fixed against movement relative to said feed cylinder and the other member being connected with said shaft to effect rotation of said shaft upon rotation of the one member.

15. An apparatus for operating on sheet material as defined in claim 14 wherein said one member comprises the nut member and the other member comprises the rod member, and a linkage means interconnecting the rod member with the shaft means so as to effect rotation of the shaft means upon reciprocation of the rod member.

References Cited

UNITED STATES PATENTS 3,190,194    6/1965    Kirby et al. _____ 93—58.2

BERNARD STICKNEY, *Primary Examiner*.